(12) United States Patent
Silverstein et al.

(10) Patent No.: US 11,954,778 B2
(45) Date of Patent: Apr. 9, 2024

(54) AVATAR RENDERING OF PRESENTATIONS (71) Applicant: International Business Machines Corporation, Armonk, NY (US)

(72) Inventors: Zachary A. Silverstein, Georgetown, TX (US); Nadiya Kochura, Bolton, MA (US); Tiberiu Suto, Franklin, NY (US); Hemant Kumar Sivaswamy, Pune (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/567,937

(22) Filed: Jan. 4, 2022

(65) Prior Publication Data

US 2023/0215067 A1 Jul. 6, 2023

(51) Int. Cl.
*G06T 13/20* (2011.01)
*G06F 3/01* (2006.01)
*G06T 13/40* (2011.01)
*G06T 13/80* (2011.01)

(52) U.S. Cl.
CPC ............ *G06T 13/205* (2013.01); *G06F 3/013* (2013.01); *G06T 13/40* (2013.01); *G06T 13/80* (2013.01)

(58) Field of Classification Search
CPC .................................................. G06T 13/205
See application file for complete search history.

(56) References Cited

U.S. PATENT DOCUMENTS

| 11,113,859 | B1* | 9/2021 | Xiao | ...................... | G06T 15/005 |
| 2004/0044532 | A1* | 3/2004 | Karstens | ............ | H04N 21/4126 |
| | | | | | 704/271 |
| 2004/0169639 | A1 | 9/2004 | Pate | | |
| 2007/0188502 | A1* | 8/2007 | Bishop | ................ | H04L 12/1827 |
| | | | | | 345/473 |
| 2011/0161837 | A1 | 6/2011 | Betzler | | |
| 2013/0275886 | A1 | 10/2013 | Haswell | | |
| 2015/0185870 | A1 | 7/2015 | Nouri | | |

(Continued)

FOREIGN PATENT DOCUMENTS

| JP | 2009003446 A | 1/2009 |
| WO | 2008010950 A2 | 1/2008 |

OTHER PUBLICATIONS

"A System and Method to Render an Educational Agent via Real World Video Extraction," An IP.com Prior Art Database Technical Disclosure, Authors et al.: Disclosed Anonymously, IP.com No. IPCOM000262652D, IP.com Electronic Publication Date: Jun. 17, 2020, 3 pages.

(Continued)

*Primary Examiner* — Shivang I Patel
(74) *Attorney, Agent, or Firm* — Michael A. Petrocelli (57) ABSTRACT A computer-implemented method for avatar rendering of virtual presentations is disclosed. The computer-implemented method includes extracting visual content from a presentation. The computer-implemented method further includes extracting audio content from the presentation. The computer-implemented method includes correlating the visual content with the audio content of the presentation. The computer-implemented method includes generating a virtual avatar to dynamically render a virtual presentation to a viewer, based at least in part, on the correlated visual content and audio content of the presentation.

20 Claims, 5 Drawing Sheets (56) References Cited

U.S. PATENT DOCUMENTS

2019/0392627 A1* 12/2019 Grant .................... G06F 3/017
2021/0110154 A1     4/2021 Beller

OTHER PUBLICATIONS

André et al., "WebPersona: a lifelike presentation agent for the World-Wide Web," Knowledge-Based Systems, vol. 11, No. 1, pp. 25-36, 1998.

E&T Editorial Staff, "Automated lip-syncing made possible with machine learning", E&T Magazine, Published Wednesday Jul. 12, 2017, 4 pages, <https://eandt.theiet.org/content/articles/2017/07/automated-lip-syncing-made-possible-with-machine-learning/>.

fppt.com, "Add Speaking Animated Characters to PowerPoint Slides With SitePal." <https://www.free-power-point-templates.com/articles/add-speaking-animated-characters-to-powerpoint-slides-with-sitepal/>, 2 pages, Copyright@ 2021 fppt.com.

Mell et al., "The NIST Definition of Cloud Computing", Recommendations of the National Institute of Standards and Technology, NIST Special Publication 800-145, Sep. 2011, 7 pages.

Nijholt, Anton, "Towards the Automatic Generation of Virtual Presenter Agents," Informing Science Journal, vol. 9, 2006 (suppl 2), pp. 97-110.

Noma et al., "Design of a Virtual Human Presenter", IEEE Computer Graphics and Applications, Jul./Aug. 2020, pp. 79-85.

Van Welbergen et al., "Presenting in Virtual Worlds: An Architecture for a 3D Anthropomorphic Presenter," IEEE Intelligent Systems, vol. 21, No. 5, pp. 47-53, Sep.-Oct. 2006.

Xie et al., "Expressive talking avatar synthesis and animation." Multimed Tools Appl, (2015), 74:9845-9848, DOI 10.1007/s11042-015-2460-5.

* cited by examiner

AVATAR RENDERING OF PRESENTATIONS

BACKGROUND

The present invention relates generally to the field of virtual presentations, and more particularly, to avatar rendering of virtual presentations lacking a physical presenter.

Virtual presentations typically are in the form of slideshows or PowerPoint presentations, and allow participants to join a presentation virtually from any geographic location. Virtual presentations can include image and video data, such as a slideshow presentation, a live video stream or recorded video of the presenter, and audio data associated with the image and video data Avatars are graphical representations of people, characters, or things. Avatars can express hand and facial movements to mimic those of humans.

SUMMARY

According to one embodiment of the present invention, a computer-implemented method for avatar rendering of virtual presentations is disclosed. The computer-implemented method includes extracting visual content from a presentation. The computer-implemented method further includes extracting audio content from the presentation. The computer-implemented method includes correlating the visual content with the audio content of the presentation. The computer-implemented method includes generating a virtual avatar to dynamically render a virtual presentation to a viewer, based at least in part, on the correlated visual content and audio content of the presentation.

According to another embodiment of the present invention, a computer program product for avatar rendering of virtual presentations is disclosed. The computer program product includes one or more computer readable storage media and program instructions stored on the one or more computer readable storage media. The program instructions include instructions to extract visual content from a presentation. The program instructions further include instructions to extract audio content from the presentation. The program instructions further include instructions to correlate the visual content with the audio content of the presentation. The program instructions further include instructions to generate a virtual avatar to dynamically render a virtual presentation to a viewer, based at least in part, on the correlated visual content and audio content of the presentation.

According to another embodiment of the present invention, a computer system for avatar rendering of virtual presentations is disclosed. The computer system includes one or more computer processors, one or more computer readable storage media, and computer program instructions, the computer program instructions being stored on the one or more computer readable storage media for execution by the one or more computer processors. The program instructions include instructions to extract visual content from a presentation. The program instructions further include instructions to extract audio content from the presentation. The program instructions further include instructions to correlate the visual content with the audio content of the presentation. The program instructions further include instructions to generate a virtual avatar to dynamically render a virtual presentation to a viewer, based at least in part, on the correlated visual content and audio content of the presentation.

BRIEF DESCRIPTION OF DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

The present invention relates generally to the field of virtual presentations, and more particularly, to avatar rendering of virtual presentations lacking a physical presenter.

Virtual presentations have become increasingly popular with many employees and students working and learning remotely. Some virtual presentations have a prerecorded video of the presenter or live stream the presenter presenting the material alongside the virtual presentation material. However, many virtual presentations lack a visual presenter. Some presenters turn their video off or only record an audio clip to discuss the presentation materials. Eye contact is very important in presentations in order to keep the audience connected. Presentations lacking a visual speaker (and thus lacking any eye contact with the audience), tend to lose the audiences interest in the presentation material.

Embodiments of the present invention recognize that it is difficult to interact with and keep the attention of an audience during a virtual presentation without a visual presenter. This is especially evident with younger viewers, such as young children watching a virtual educational presentation remotely. Embodiments of the present invention recognize eye contact is very important to keep the attention of the user watching the virtual presentation.

Embodiments of the present invention improve upon user engagement of virtual presentations by extract the audio and visual data from the presentation to generate and display an avatar during the presentation that maintains eye contain with the user during the virtual presentation. Embodiments of the present invention correlate the audio and visual data with an avatar to simulate eye connect with audience members to maintain the audience members interest in the presentation material, as well as improve the audience members understanding of the presentation material.

Embodiments of the present invention allow a presenter or user to customize the avatar to look or sound similar to the presenter, character, cartoon, or other person to enhance interest and improve understanding of presentation topics and materials.

The present invention may be a system, a method, and/or a computer program product at any possible technical detail level of integration. The computer program product may include a computer readable storage medium (or media) having computer readable program instructions thereon for causing a processor to carry out aspects of the present.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suit-able combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 1:
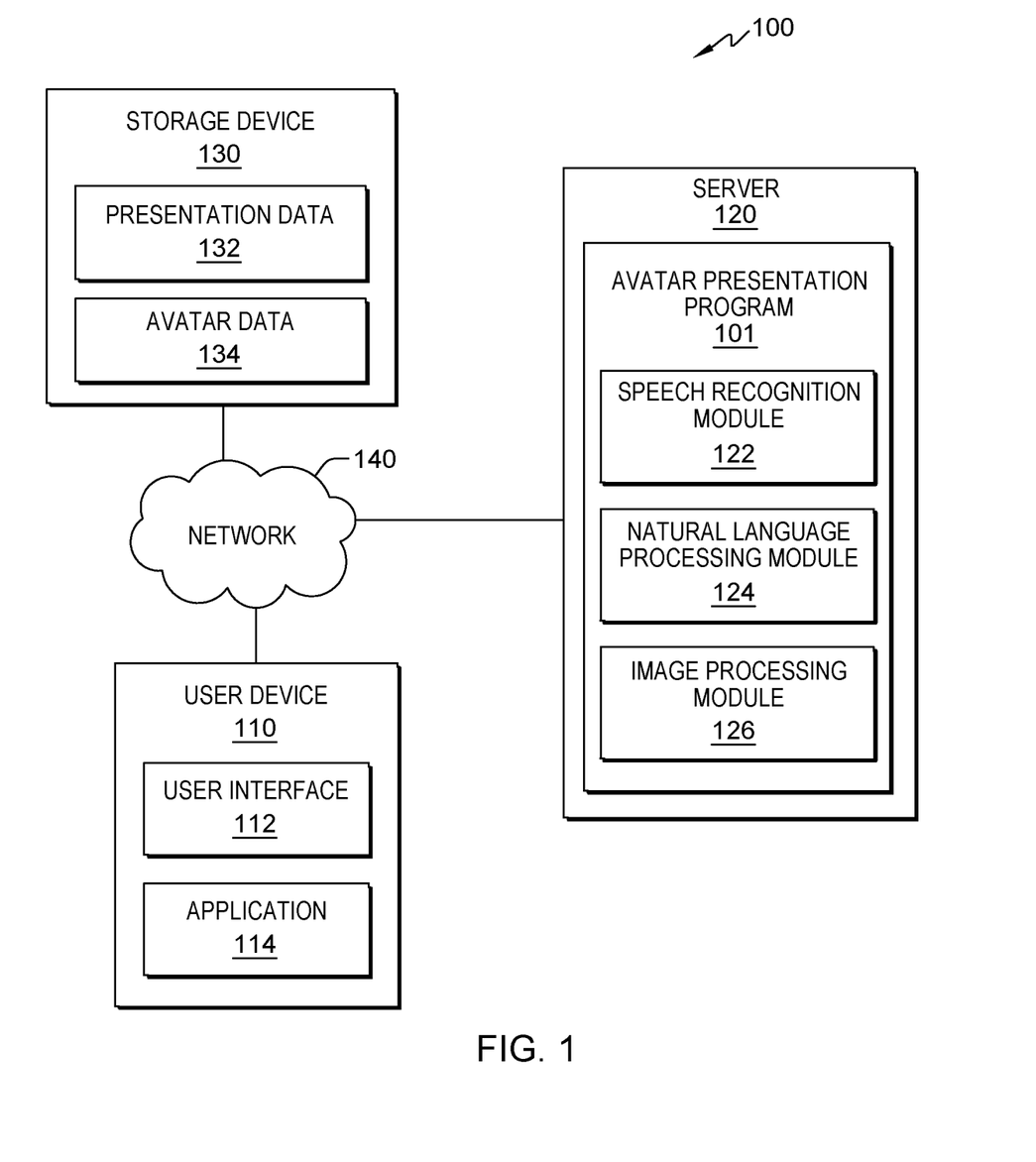
FIG. 1 is a block diagram of a network computing environment suitable for an avatar presentation program 101, generally designated 100, in accordance with at least one embodiment of the present invention.

The present invention will now be described in detail with reference to the Figures. FIG. 1 is a functional block diagram of a network computing environment suitable for an avatar presentation program 101, generally designated 100, in accordance with at least one embodiment of the present invention. In an embodiment, network computing environment 100 may be provided by cloud computing environment 50, as depicted and described with reference to FIG. 4, in accordance with at least one embodiment of the present invention. FIG. 1 provides an illustration of only one implementation and does not imply any limitations with regard to the environments in which different embodiments may be implemented. Many modifications to the depicted environment may be made by those skilled in the art without departing from the scope of the present invention as recited by the claims.

Network computing environment 100 includes user device 110, server 120, and storage device 130 interconnected over network 140. User device 110 may represent a computing device of a user, such as a laptop computer, a tablet computer, a netbook computer, a personal computer, a desktop computer, a personal digital assistant (PDA), a smart phone, a wearable device (e.g., smart glasses, smart watches, e-textiles, AR headsets, etc.), or any programmable computer systems known in the art. In general, user device 110 can represent any programmable electronic device or combination of programmable electronic devices capable of executing machine readable program instructions and communicating with server 120, storage device 130 and other devices (not depicted) via a network, such as network 140. User device 110 can include internal and external hardware components, as depicted and described in further detail with respect to FIG. 3.

In an embodiment, user device 110 is used to display presentation data, such as image, video, and audio data to an audience member of a real-time or pre-recorded virtual presentation. In an embodiment, presentation data includes image, video, and audio data associated with the presentation, such as a slideshow, audio recording, video recording, images, or text. In an embodiment, a user utilizes user device 110 to input various avatar presentation preferences, such as accents, physical features, characters, or people preferred for the avatar. In an embodiment, the avatar presentation preferences are selected by the presenter presenting the presentation or the user listening to and/or watching the presentation.

User device 110 further includes user interface 112 and application 114. User interface 112 is a program that provides an interface between a user of an end user device, such as user device 110, and a plurality of applications that reside on the device (e.g., application 114). A user interface, such as user interface 112, refers to the information (such as graphic, text, and sound) that a program presents to a user, and the control sequences the user employs to control the program. A variety of types of user interfaces exist. In one embodiment, user interface 112 is a graphical user interface. A graphical user interface (GUI) is a type of user interface that allows users to interact with electronic devices, such as a computer keyboard and mouse, through graphical icons and visual indicators, such as secondary notation, as opposed to text-based interfaces, typed command labels, or text navigation. In computing, GUIs were introduced in reaction to the perceived steep learning curve of command-line interfaces which require commands to be typed on the keyboard. The actions in GUIs are often performed through direct manipulation of the graphical elements. In another embodiment, user interface 112 is a script or application programming interface (API). In an embodiment, user interface 112 displays the presentation and avatar. In an embodiment, user interface 112 displays a message pop-up requesting user input or preferences. For example, user interface 112 displays a message pop-up requesting user input for the hair color, facial expressions, clothing, characters, voices, or similar for the avatar.

Application 114 can be representative of one or more applications (e.g., an application suite) that operate on user device 110. In an embodiment, application 114 is representative of one or more applications (e.g., social media applications, web conferencing applications, email applications, and virtual presentation applications) located on user device 110. In various example embodiments, application 114 can be an application that a user of user device 110 utilizes to participate in online presentations, such as an audio or video presentation. In an embodiment, application 114 can be a client-side application associated with a server-side application running on server 120 (e.g., a client-side application associated with avatar presentation program 101). In an embodiment, application 114 can operate to perform processing steps of avatar presentation program 101 (i.e., application 114 can be representative of avatar presentation program 101 operating on user device 110). In an embodiment, application 114 is utilized by a user to view an avatar rendering a virtual presentation.

Server 120 is configured to provide resources to various computing devices, such as user device 110. For example, server 120 may host various resources, such as speech recognition module 122, natural language processing module 124, and image processing module 126 that are accessed and utilized by a plurality of devices participating in an audio or video presentation. In various embodiments, server 120 is a computing device that can be a standalone device, a management server, a web server, an application server, a mobile device, or any other electronic device or computing system capable of receiving, sending, and processing data. In an embodiment, server 120 represents a server computing system utilizing multiple computers as a server system, such as in a cloud computing environment. In an embodiment, server 120 represents a computing system utilizing clustered computers and components (e.g. database server computer, application server computer, web server computer, webmail server computer, media server computer, etc.) that act as a single pool of seamless resources when accessed within network computing environment 100. In general, server 120 represents any programmable electronic device or combination of programmable electronic devices capable of executing machine readable program instructions and communicating with each other, as well as with user device 110, storage device 130, and other computing devices (not shown) within network computing environment 100 via a network, such as network 140.

In an embodiment, server 120 includes avatar presentation program 101, which further includes speech recognition module 122, natural language processing module 124, and image processing module 126. In an embodiment, avatar presentation program 101 may be configured to access various data sources, such as storage device 130, presentation data 132 and avatar data 134 that may include personal data, content, contextual data, or information that a user does not want to be processed. Personal data includes personally identifying information or sensitive personal information as well as user information, such as location tracking or geolocation information. Processing refers to any operation, automated or unautomated, or set of operations such as collecting, recording, organizing, structuring, storing, adapting, altering, retrieving, consulting, using, disclosing by transmission, dissemination, or otherwise making available, combining, restricting, erasing, or destroying personal data. In an embodiment, avatar presentation program 101 enables the authorized and secure processing of personal data. In an embodiment, avatar presentation program 101 provides informed consent, with notice of the collection of personal data, allowing the user to opt in or opt out of processing personal data. Consent can take several forms. Opt-in consent can impose on the user to take an affirmative action before personal data is processed. Alternatively, opt-out consent can impose on the user to take an affirmative action to prevent the processing of personal data before personal data is processed. In an embodiment, avatar presentation program 101 provides information regarding personal data and the nature (e.g., type, scope, purpose, duration, etc.) of the processing. In an embodiment, avatar presentation program 101 provides a user with copies of stored personal data. In an embodiment, avatar presentation program 101 allows for the correction or completion of incorrect or incomplete personal data. In an embodiment, avatar presentation program 101 allows for the immediate deletion of personal data.

In an embodiment, speech recognition module 122 is a form of computer software and/or hardware utilized to convert audio data associated with a virtual presentation into textual data. In an embodiment, speech recognition module 122 extracts the audio or speech of a virtual presentation and converts the audio or speech into text. For example, speech recognition module 122 receives audio associated with a presenter of a virtual presentation and converts the audio into text.

In an embodiment, natural language processing module 124 is a form of computer software and/or hardware utilized to understand the meaning or context of the audio and/or the audio converted to text. For example, the textual data included in presentation materials or textual data converted from the audio data. Natural language processing is a subfield of linguistics, computer science, and artificial intelligence for processing natural language data. In various embodiments, natural language processing module 124 separates speech into words, for example, through the use of word segmentation or tokenization. Word segmentation is the separation of continuous text into words. For example, as a presenter is speaking, speech converted into text is separated into individual words. Tokenization is the process of breaking up and classifying sections of a string of input characters. For example, as a presenter is speaking, the raw words are broken up into words, sentences, or phrases. In an embodiment, natural language processing module 124 determines the context of textual data from a presenter. In an embodiment, natural language processing module 124 determines the context of textual data from one or more words identified in the presentation data. In various embodiments, avatar presentation program 101 stores the individual words and individual sentences as presentation data 132 in storage device 130.

In an embodiment, image processing module 126 is a form of computer software and/or hardware utilized to perform image analysis to identify the particular objects in an image or video, as well as to understand the context of one or more images as a whole. In an embodiment, image processing module 126 extracts visual content via optical character recognition and machine vision of presented content. Optical character recognition is the electronic or mechanical conversion of images of typed, handwritten or printed text into machine-encoded text, whether from a scanned document, a photo of a document, a scene-photo or from subtitle text superimposed on an image. Machine vision is the technology and methods used to provide imaging-based automatic inspection and analysis.

Figure 3:
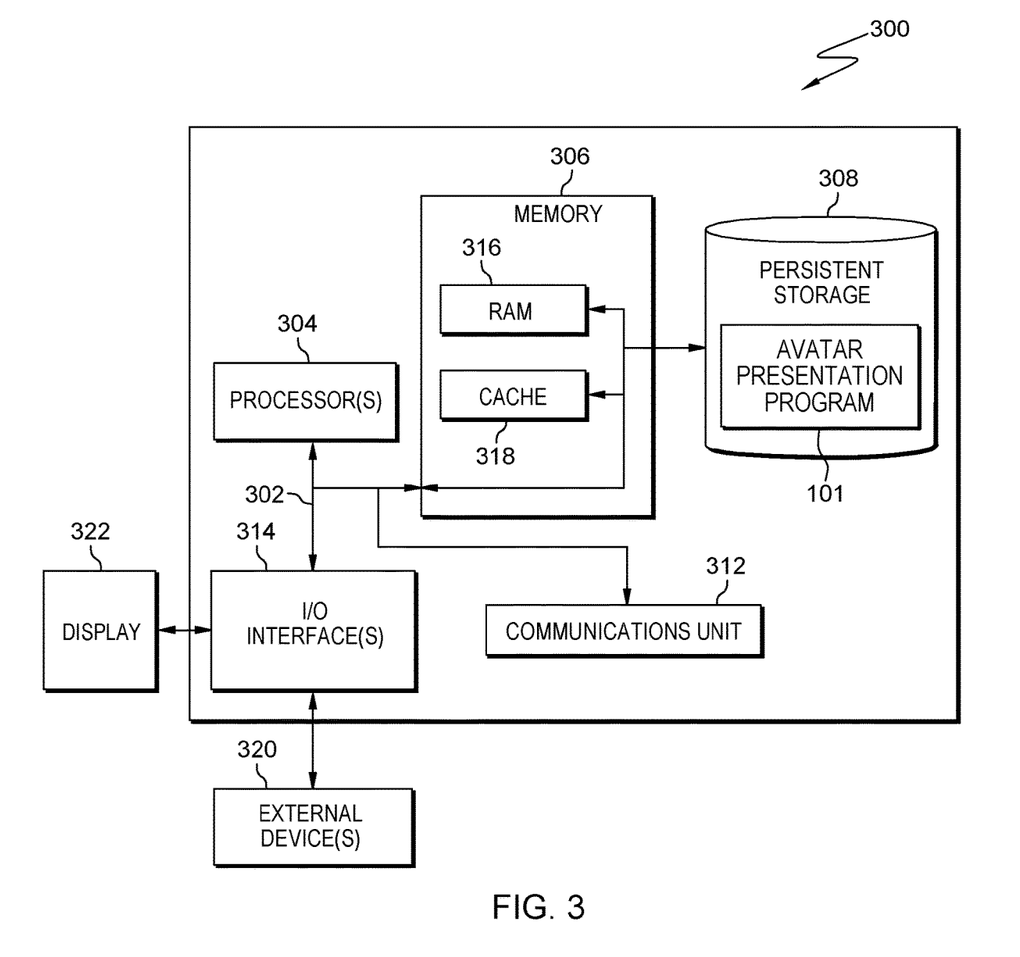
FIG. 3 is a block diagram depicting components of a computer, generally designated 300, suitable for executing an avatar presentation program 101 in accordance with at least one embodiment of the present invention.
Figure 4:
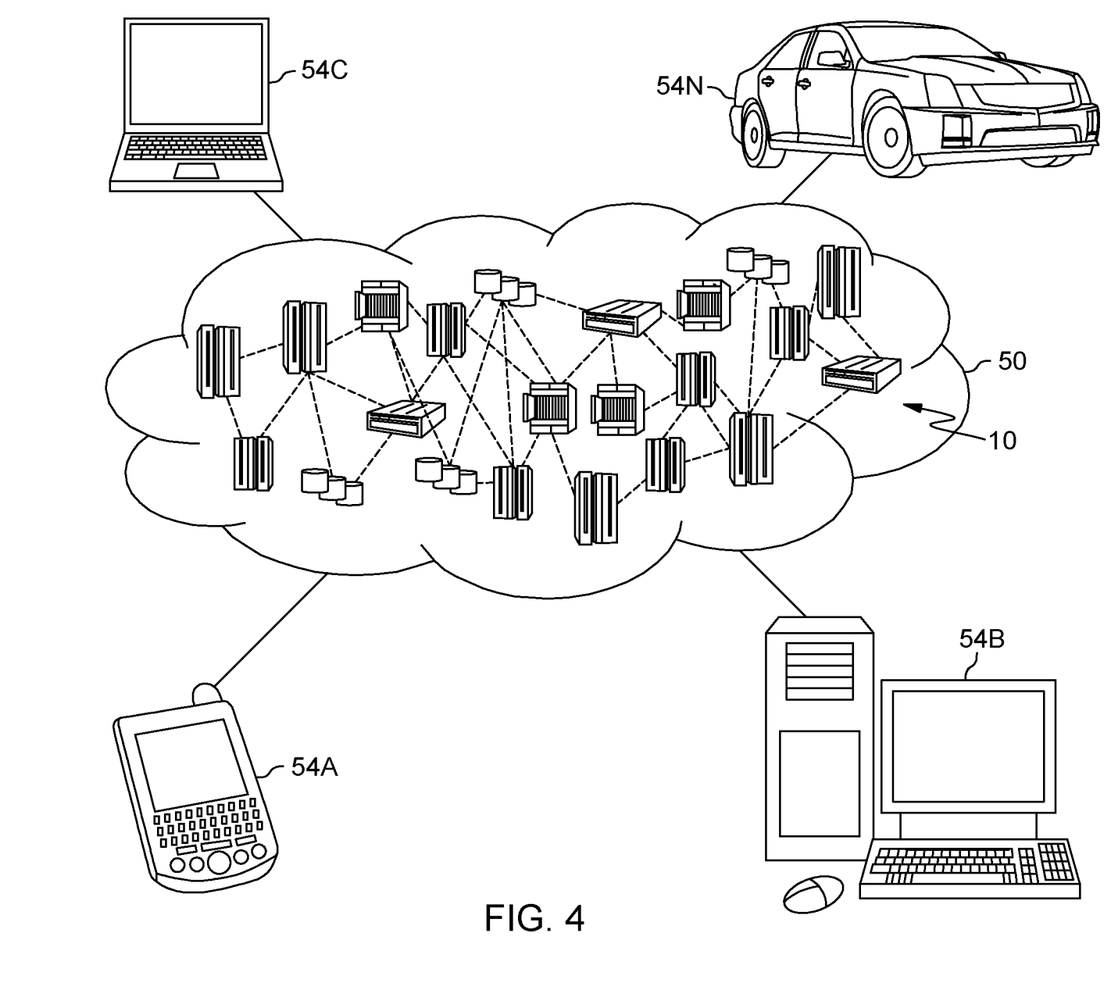
FIG. 4 is a block diagram depicting a cloud computing environment 50 in accordance with at least one embodiment of the present invention.

Server 120 may include components as depicted and described in detail with respect to cloud computing node 10, as described in reference to FIG. 4, in accordance with at least one embodiment of the present invention. Server 120 may include components, as depicted and described in detail with respect to computing device 300 of FIG. 3, in accordance with at least one embodiment of the present invention.

In various embodiments, storage device 130 is a secure data repository for persistently storing presentation and avatar data utilized by various applications and user devices of a user, such as user device 110. Storage device 130 may be implemented using any volatile or non-volatile storage media known in the art for storing data. For example, storage device 130 may be implemented with a tape library, optical library, one or more independent hard disk drives, multiple hard disk drives in a redundant array of independent disks (RAID), solid-state drives (SSD), random-access memory (RAM), and any possible combination thereof. Similarly, storage device 130 may be implemented with any suitable storage architecture known in the art, such as a relational database, an object-oriented database, or one or more tables.

In an embodiment, storage device 130 comprises presentation data 132 and avatar data 134. In an embodiment, presentation data 132 comprises data related to the presentation. In an embodiment, presentation data 132 includes text, image, video, and audio data associated with the presentation. In an embodiment, presentation data 132 includes information associated with a virtual presentation, and generated by speech recognition module 122, natural language processing module 124, and image processing module 126. In an embodiment, avatar presentation program 101 receives a presentation and stores the presentation and relevant data as presentation data 132. In an embodiment, avatar presentation program 101 utilizes presentation data 132 to generate and run an avatar rendering of a presentation.

In an embodiment, avatar data 134 comprises information associated with an avatar used to render a presentation. In an embodiment, avatar data 134 comprises information on the way the avatar looks, acts, and sounds. In an embodiment, avatar data 134 comprises various avatar appearance information, such as the features, clothing, accent, body movement, eye contact, and facial expressions of the avatar while rendering an online presentation. In an embodiment, avatar presentation program 101 stores user avatar preferences in avatar data 134. For example, avatar presentation program 101 receives user avatar preferences for the avatar to have brown hair and brown eyes, and avatar presentation program 101 stores this information as avatar data 134.

In an embodiment, avatar presentation program 101 receives avatar preferences from the presenter or user watching the presentation. For example, a teacher presenting the presentation or a student watching the presentation may select the particular avatar preferences for generating an avatar for rendering of a presentation. In an embodiment, a presenter or user customize the avatar to look or sound similar to the presenter, character, cartoon, or other person or animal to enhance interest.

In an embodiment, avatar presentation program 101 receives a presentation. In an embodiment, avatar presentation program 101 receives a real-time presentation. For example, avatar presentation program 101 receives a live presentation of a presenter presenting a presentation. In an embodiment, avatar presentation program 101 receives a pre-recorded presentation. For example, avatar presentation program 101 receives prerecorded audio and a presentation. In an embodiment, avatar presentation program 101 extracts visual content from the presentation. In an embodiment, avatar presentation program 101 utilizes optical character recognition and machine vision to determine the content of visual content in the presentation. For example, if the presentation has an image of a graph on slide 6, avatar presentation program 101 determines there is a graph on the bottom right of slide 6. In an embodiment, avatar presentation program 101 generates a timestamp for the visual content. For example, avatar presentation program 101 determines slide 6 is displayed on the screen from time 1:05-1:45 and generates a timestamp. In an embodiment, avatar presentation program 101 determines the text in the presentation. For example, avatar presentation program 101 determines slide 2 says "for homework please ready pages 1-10 in the textbook."

In an embodiment, avatar presentation program 101 extracts audio content from the presentation. In an embodiment, avatar presentation program 101 utilizes NLP to convert the audio data into textual data. For example, if in a prerecorded audio the presenter says "the graph shows a downward trend," avatar presentation program 101 utilizes NLP to turn the presenters spoken words into textual data of "the graph shows a downward trend." In an embodiment, avatar presentation program 101 generates a timestamp for the audio content. For example, avatar presentation program 101 determines the speaker discusses details about graph A on slide 6 from time 4:45-5:30 and generates a timestamp.

In an embodiment, avatar presentation program 101 determines topics of the presentation by cosine similarity or word2Vec association. In an embodiment, avatar presentation program 101 utilizes cosine similarity or word2Vec association to align the audio content with the visual content. Cosine similarity is a measure of similarity between two non-zero vectors of an inner product space. It is defined to equal the cosine of the angle between them, which is also the same as the inner product of the same vectors normalized to both have length 1. Word2Vec is a technique of natural language processing which uses a neural network model to learn word associates from a large corpus of texts, for example from the speech corpus or textual data.

In an embodiment, avatar presentation program 101 determines topics of the presentation from the audio content or visual content, such as image and video data. For example, if the audio content comprises audio of "bears sleep in the winter" and the visual content comprises a picture of a bear sleeping on slide 2, avatar presentation program 101 determines the topic of slide 2 to be hibernation. In an embodiment, avatar presentation program 101 determines topics based on text and image based data, such as the title of one or more slides. For example, if avatar presentation program 101 determines the first slide says "Hibernating Animals", avatar presentation program 101 determines the topic of the presentation to be hibernating animals.

In an embodiment, avatar presentation program 101 correlates the audio content and visual content to determine audio content data that corresponds to visual content data. For example, if the presenter audio mentions "patent law section 101", avatar presentation program 101 determines wherein the presentation "patent law section 101" content is discussed. In an embodiment, avatar presentation program 101 correlates the audio content and visual content by correlating timestamps. For example, at time 2:30, avatar presentation program 101 determines the audio data contains content associated with "patent law section 101" and at time 2:25 to 2:45, slide 5 is displayed with a bullet point including textual data corresponding to content related to "patent law section 101." In an embodiment, avatar presentation program 101 highlights the visual content of the presentation as the corresponding audio content is discussed. From the previous example, avatar presentation program 101 highlights the bullet point including textual data associated with the presentation content of "patent law section 101" at time 2:30 as the audio data associated with "patent law section 101" is played.

In an embodiment, the presentation is presented in real-time and avatar presentation program 101 correlates the location of the image or video content of the presentation with the audio content of the presentation. For example, if the presenter says "on graph C, there is a spike around 10 years", avatar presentation program 101 determines graph C is located at the top left of slide 5.

In an embodiment, avatar presentation program 101 generates an avatar, based at least in part, on user based or presented based avatar presentation preferences. For example, if the user avatar presentation preferences include graphics to represent a specific presenter, teacher, person, or character, avatar presentation program 101 generates an avatar to represent the specific presenter, teacher, person, or character for rendering a presentation. In another example, if user avatar presentation preferences include black hair and blue eyes, the avatar presentation program 101 generates an avatar to include black hair and blue eyes for rendering a presentation.

In an embodiment, avatar presentation program 101 generates an avatar for rendering a presentation, based at least in part, on the audio content correlated with the image or video content of the presentation. In an embodiment, avatar presentation program 101 generates an avatar to dynamically present or otherwise render audio, image, and video data associated with the presentation material. For example, avatar presentation program 101 generates the avatar to lip sync the audio data of the presentation simultaneously as the image or video data associated with the presentation is being displayed to a viewer. In an embodiment, avatar presentation program 101 generates an avatar to perform hand gestures associated with related audio, image, and video data as the audio, image, and video data is being presented to the viewer. For example, when the presenter mentions bullet 4 on slide 3, avatar presentation program 101 causes the avatar to point to bullet 4 on slide 3.

In an embodiment, avatar presentation program 101 generates an avatar capable of emulating eye contact with the user, and exhibiting body language cues that mimic human conversational behavior consistent with the context and content of the presentation. In some embodiments, to simulate eye contact with the user, the augmented reality device uses eye-tracking technology to determine where the user is looking, and more particularly to determine where the user's line of sight intersects the augmented reality device display screen (called the intersection point). For example, avatar presentation program 101 generates an avatar to engage with the user by tracking users eyes and moving the avatars eyes based on user eye movement.

In an embodiment, avatar presentation program 101 displays the avatar alongside of, adjacent to, overlap, or overlaying the presentation. For example, avatar presentation program 101 displays the avatar on the left side of the screen and the presentation on the right side of the screen.

In an embodiment, avatar presentation program 101 receives an audio and a visual presentation. In an example, the audio is not an exact match to the visual presentation. In an embodiment, avatar presentation program 101 generates an avatar to refer to the content in the visual presentation at the same time of the audio presentation. For example, avatar presentation program 101 generates and displays an avatar at the bottom left of the screen facing the viewer. In an embodiment, avatar presentation program 101 generates and displays the avatar to maintain eye contact with the user to appear more lifelike. In an embodiment, avatar presentation program 101 generates and displays the avatar to lip sync the audio during the presentation. For example, while a topic is read out loud in the audio referring to the digitized board, the avatar lip syncs the respective words, points to the respective topics on the physical presentation, and maintains eye contact with the user.

In an embodiment, avatar presentation program 101 generates the avatar to have different facial expressions and hand gestures based, at least in part, on the context or emotion associated with the audio or image content. For example, if the audio content contains audio of "every student got an A on the exam," avatar presentation program 101 generates the avatar to clap their hands and have a smile on their face while lip syncing "every student got an A on the exam."

Figure 2:
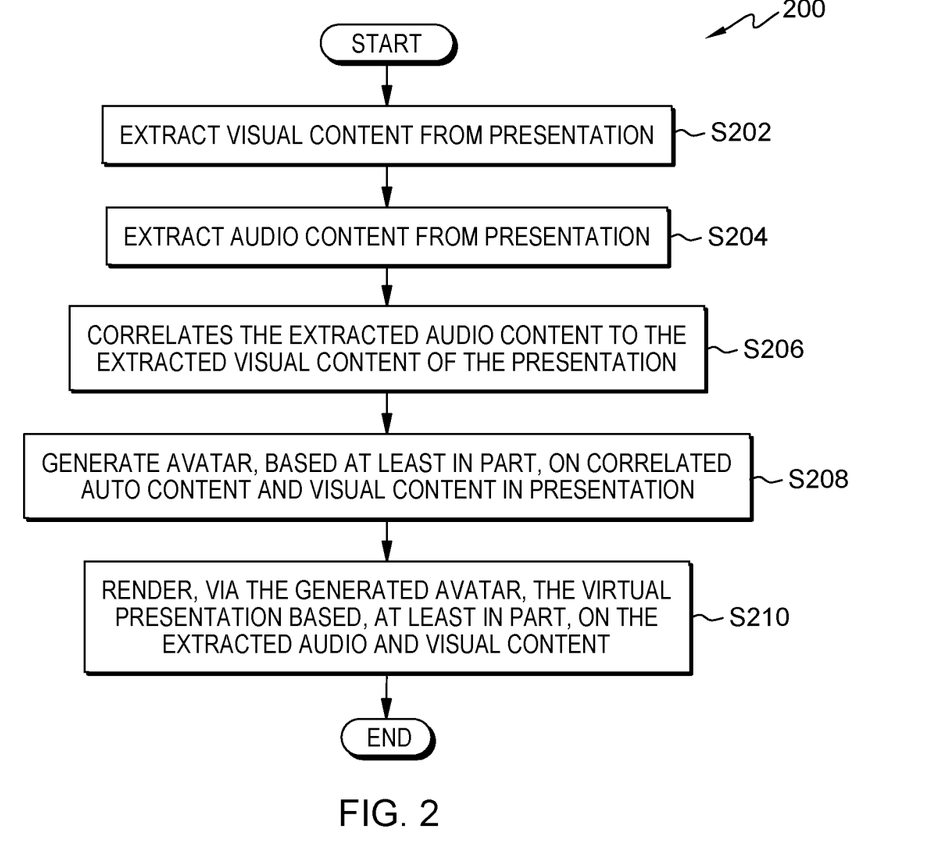
FIG. 2 is a flow chart diagram depicting operational steps for an avatar presentation program 101, generally designated 200, in accordance with at least one embodiment of the present invention.

FIG. 2 is a flow chart diagram depicting operational steps for avatar presentation program 101, generally designated 200, in accordance with at least one embodiment of the present invention. FIG. 2 provides only an illustration of one implementation and does not imply any limitations with regard to the environments in which different embodiments may be implemented. Many modifications to the depicted environment may be made by those skilled in the art without departing from the scope of the invention as recited by the claims.

At step S202, avatar presentation program 101 extracts visual content from a presentation. For example, visual content includes text, image, and video data associated with the presentation.

At step S204, avatar presentation program 101 extracts audio content from the presentation. In an embodiment, avatar presentation program 101 performs NLP to convert the audio data into textual data. For example, avatar presentation program 101 converts the presentation audio into textual data.

At step S206, avatar presentation program 101 correlates the extracted audio content to the extracted visual content of the presentation. In an embodiment, avatar presentation program 101 determines topics or contexts associated with the audio and visual content of the presentation by cosine similarity or word2Vec association. In an embodiment, avatar presentation program 101 utilizes cosine similarity or word2Vec association to align the audio content with the visual content. In an embodiment, avatar presentation program 101 correlates the audio content and visual content to determine audio content data that corresponds to visual content data.

At step S208, avatar presentation program 101 generates an avatar based, at least in part, on the correlated audio content and visual content of the presentation. In an embodiment, avatar presentation program 101 generates an avatar to perform hand gestures, lip sync the audio, and maintain eye contact with a viewer as the avatar renders the presentation. In an embodiment, avatar presentation program 101 generates an avatar based on one or more user based or presenter based avatar presentation preferences.

At step S210, avatar presentation program 101 renders, via the generated avatar, the virtual presentation based, at least in part, on the extracted audio and visual content. In an embodiment, rendering the virtual presentation includes moving the avatar to dynamically present the presentation material. In an embodiment, rendering the virtual presentation includes the avatar performing hand gestures related to the presentation displayed to the user as the audio content of the presentation associated with the presentation materials displayed to the user is discussed. In an embodiment, rendering the virtual presentation includes moving the avatars eyes based on the content discussed. In an embodiment, rendering the virtual presentation includes manipulating the avatars body movements or facial expressions based on the content discussed in the presentation. In an embodiment, rendering the virtual presentation includes manipulating the avatars arms or hands to point to, circle, or highlight material in the presentation (e.g., image or video data) displayed to the user as the particular material is being discussed. In an embodiment, rendering the virtual presentation includes manipulating the avatar to write on a virtual writing board or the presentation materials, such as images or presentation slides. In an embodiment, the avatar is manipulated to write textual or image data corresponding to the presentation materials and/or the current content being discussed during the virtual presentation. In an embodiment, rendering the virtual presentation includes manipulating the avatar to move or otherwise manipulate virtual objects displayed to a user during the virtual presentation. In an embodiment, the movement or otherwise particular manipulation of the virtual objects is based, at least in part, on the current content being discussed during the virtual presentation. In an embodiment, rendering the virtual presentation includes manipulating the avatar to walk or move around the virtual presentation environment. For example, the avatar is manipulated to move based, at least in part, on detecting that presentation material content that is currently being discussed during the virtual presentation is blocked or obscured from a viewer.

FIG. 3 is a block diagram depicting components of a computing device, generally designated 300, suitable for avatar presentation program 101 in accordance with at least one embodiment of the invention. Computing device 300 includes one or more processor(s) 304 (including one or more computer processors), communications fabric 302, memory 306 including, RAM 316 and cache 318, persistent storage 308, which further includes avatar presentation program 101, communications unit 312, I/O interface(s) 314, display 322, and external device(s) 320. It should be appreciated that FIG. 3 provides only an illustration of one embodiment and does not imply any limitations with regard to the environments in which different embodiments may be implemented. Many modifications to the depicted environment may be made.

As depicted, computing device 300 operates over communications fabric 302, which provides communications between computer processor(s) 304, memory 306, persistent storage 308, communications unit 312, and input/output (I/O) interface(s) 314. Communications fabric 302 can be implemented with any architecture suitable for passing data or control information between processor(s) 304 (e.g., microprocessors, communications processors, and network processors), memory 306, external device(s) 320, and any other hardware components within a system. For example, communications fabric 302 can be implemented with one or more buses.

Memory 306 and persistent storage 308 are computer readable storage media. In the depicted embodiment, memory 306 includes random-access memory (RAM) 316 and cache 318. In general, memory 306 can include any suitable volatile or non-volatile one or more computer readable storage media.

Program instructions for avatar presentation program 101 can be stored in persistent storage 308, or more generally, any computer readable storage media, for execution by one or more of the respective computer processor(s) 304 via one or more memories of memory 306. Persistent storage 308 can be a magnetic hard disk drive, a solid-state disk drive, a semiconductor storage device, read-only memory (ROM), electronically erasable programmable read-only memory (EEPROM), flash memory, or any other computer readable storage media that is capable of storing program instructions or digital information.

Media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 308.

Communications unit 312, in these examples, provides for communications with other data processing systems or devices. In these examples, communications unit 312 can include one or more network interface cards. Communications unit 312 may provide communications through the use of either or both physical and wireless communications links. In the context of some embodiments of the present invention, the source of the various input data may be physically remote to computing device 300 such that the input data may be received, and the output similarly transmitted via communications unit 312.

I/O interface(s) 314 allows for input and output of data with other devices that may operate in conjunction with computing device 300. For example, I/O interface(s) 314 may provide a connection to external device(s) 320, which may be as a keyboard, keypad, a touch screen, or other suitable input devices. External device(s) 320 can also include portable computer readable storage media, for example thumb drives, portable optical or magnetic disks, and memory cards. Software and data used to practice embodiments of the present invention can be stored on such portable computer readable storage media and may be loaded onto persistent storage 308 via I/O interface(s) 314. I/O interface(s) 314 also can similarly connect to display 322. Display 322 provides a mechanism to display data to a user and may be, for example, a computer monitor.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

FIG. 4 is a block diagram depicting a cloud computing environment 50 in accordance with at least one embodiment of the present invention. Cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
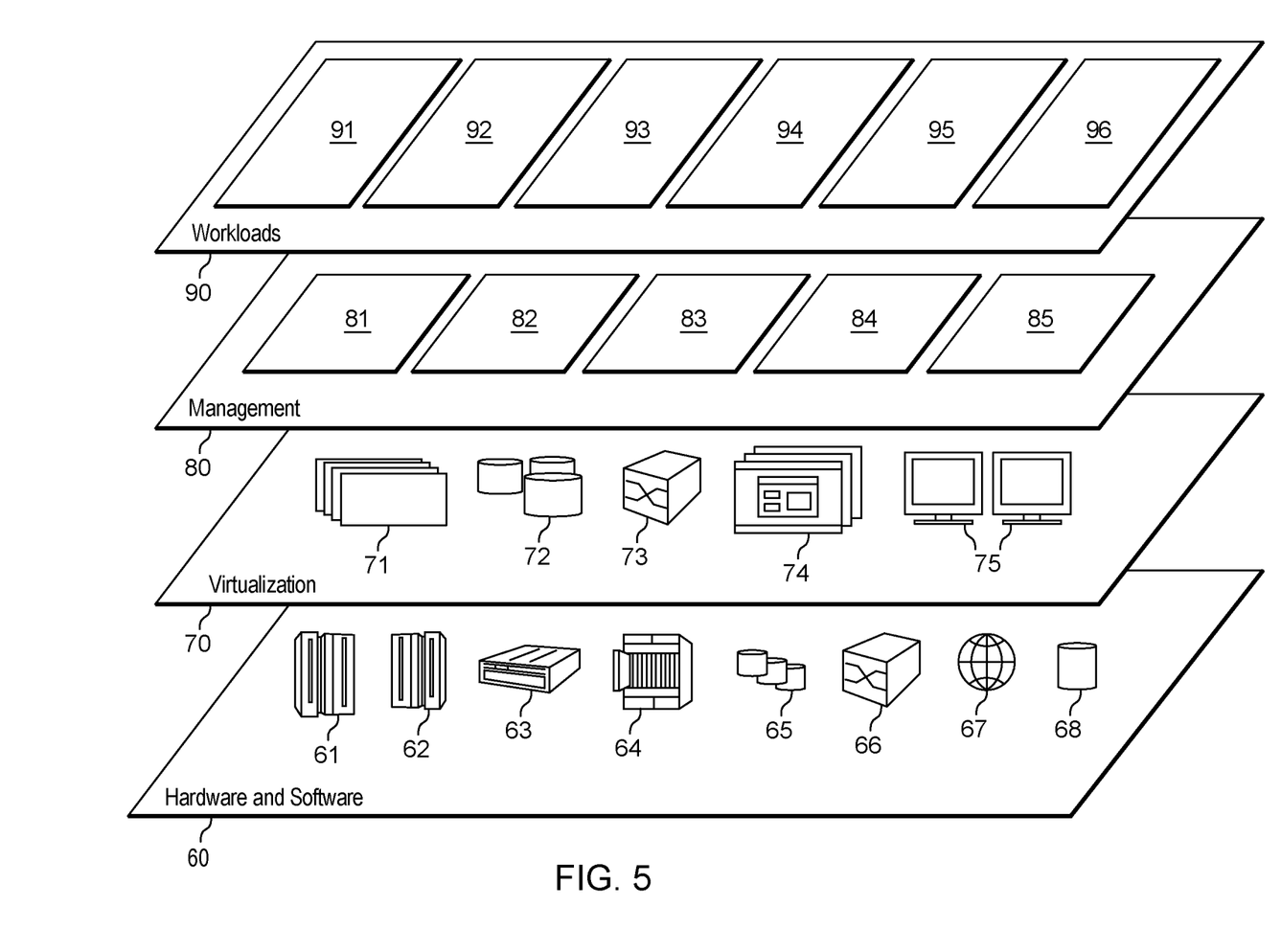
FIG. 5 is block diagram depicting a set of functional abstraction model layers provided by cloud computing environment 50 depicted in FIG. 4 in accordance with at least one embodiment of the present invention.

FIG. 5 is block diagram depicting a set of functional abstraction model layers provided by cloud computing environment 50 depicted in FIG. 4 in accordance with at least one embodiment of the present invention. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and presentation avatar 96.

What is claimed is:

1. A computer-implemented method for avatar rendering of virtual presentations, the computer-implemented method comprising:
    extracting visual content from a presentation;
    generating a first timestamp for the visual content;
    extracting audio content from the presentation;
    generating a second timestamp for the audio content;
    converting the extracted audio content into textual data using natural language processing to determine audio content being played;
    determining a context of the visual content and the audio content of the presentation;
    based on visual content data of the visual content associated with the first timestamp matching audio content data of the audio content associated with the second timestamp, correlating the visual content with the audio content as the audio content is played;
    generating a virtual avatar to dynamically render a virtual presentation to a viewer, based at least in part, on the correlated visual content and audio content, wherein the virtual avatar emulates eye contact with the viewer and exhibits a body language consistent with the context, the visual content, and the audio content of the presentation; and
    highlighting the correlated visual content of the presentation as the correlated audio content is played.

2. The computer-implemented method of claim 1, wherein the virtual avatar emulating eye contact with the viewer comprises:
    determining, using eye-tracking technology, an intersection point between a line of sight associated with the viewer and an augmented reality display screen.

3. The computer-implemented method of claim 1, wherein rendering the virtual presentation further comprises:

determining the viewer's eye focus; and manipulating the avatar's eyes to maintain eye contact with the viewer.

4. The computer-implemented method of claim 1, wherein generating the virtual avatar is further based, at least in part, on one or more avatar presentation preferences selected from the group consisting of accents, physical features, characters, and people preferred for the virtual avatar.

5. The computer-implemented method of claim 1, wherein rendering the virtual presentation further includes manipulating the avatar's facial expressions based on the audio content played in the virtual presentation.

6. The computer-implemented method of claim 1, wherein rendering the virtual presentation further includes manipulating the avatar's mouth to lip sync the audio content of the presentation simultaneously while the visual content associated with the audio content of the virtual presentation is being displayed to the viewer.

7. The computer-implemented method of claim 1, wherein rendering the virtual presentation further includes manipulating the avatar's hands to produce one or more hand gestures in relation to visual content displayed to the viewer as the audio content of the virtual presentation associated with the visual content is played.

8. A computer program product for rendering of virtual presentations, the computer program product comprising one or more computer readable storage media and program instructions stored on the one or more computer readable storage media, the program instructions including instructions to:

extract visual content from a presentation;

generate a first timestamp for the visual content;

extract audio content from the presentation;

generate a second timestamp for the audio content;

convert the extracted audio content into textual data using natural language processing to determine audio content being played;

determine a context of the visual content and the audio content of the presentation;

based on visual content data of the visual content associated with the first timestamp matching audio content data of the audio content associated with the second timestamp, correlate the visual content with the audio content as the audio content is played;

generate a virtual avatar to dynamically render a virtual presentation to a viewer, based at least in part, on the correlated visual content and audio content, wherein the virtual avatar emulates eye contact with the viewer and exhibits a body language consistent with the context, the visual content, and the audio content of the presentation; and highlight the correlated visual content with corresponding audio content as the correlated audio content is played.

9. The computer program product of claim 8, wherein the virtual avatar emulating eye contact with the viewer comprises instructions to:

determine, using eye-tracking technology, an intersection point between a line of sight associated with the viewer and an augmented reality display screen.

10. The computer program product of claim 8, wherein the instructions to render the virtual presentation further comprises instructions to:

determine the viewer's eye focus; and manipulate the avatar's eyes to maintain eye contact with the viewer.

11. The computer program product of claim 8, wherein the instructions to generate the virtual avatar is further based, at least in part, on one or more avatar presentation preferences selected from the group consisting of accents, physical features, characters, and people preferred for the virtual avatar.

12. The computer program product of claim 8, wherein the instructions to render the virtual presentation further includes instructions to manipulate the avatar's facial expressions based on the audio content played in the virtual presentation.

13. The computer program product of claim 8, wherein the instructions to render the virtual presentation further includes instructions to manipulate the avatar's mouth to lip sync the audio content of the presentation simultaneously while the visual content associated with the audio content of the virtual presentation is being displayed to the viewer.

14. The computer program product of claim 8, wherein the instructions to render the virtual presentation further includes instructions to manipulating the avatar's hands to produce one or more hand gestures in relation to visual content displayed to the viewer as the audio content of the virtual presentation associated with the visual content is played.

15. A computer system for rendering of virtual presentations, comprising:

one or more computer processors;

one or more computer readable storage media;

computer program instructions;

the computer program instructions being stored on the one or more computer readable storage media for execution by the one or more computer processors; and the computer program instructions including instructions to:

extract visual content from a presentation;

generate a first timestamp for the visual content;

extract audio content from the presentation;

generate a second timestamp for the audio content;

convert the extracted audio content into textual data using natural language processing to determine audio content being played;

determine a context of the visual content and the audio content of the presentation;

based on visual content data of the visual content associated with the first timestamp matching audio content data of the audio content associated with the second timestamp, correlate the visual content with the audio content as the audio content is played;

generate a virtual avatar to dynamically render a virtual presentation to a viewer, based at least in part, on the correlated visual content and audio content, wherein the virtual avatar emulates eye contact with the viewer and exhibits a body language consistent with the context, the visual content, and the audio content of the presentation; and highlight the correlated visual content with corresponding audio content as the correlated audio content is played.

16. The computer system of claim 15, wherein the virtual avatar emulating eye contact with the viewer comprises instructions to:

determine, using eye-tracking technology, an intersection point between a line of sight associated with the viewer and an augmented reality display screen.

17. The computer system of claim 15, wherein the instructions to render the virtual presentation further comprises instructions to:

determine the viewer's eye focus; and manipulate the avatar's eyes to maintain eye contact with the viewer.

18. The computer system of claim 15, wherein the instructions to generate the virtual avatar is further based, at least in part, on one or more avatar presentation preferences selected from the group consisting of accents, physical features, characters, and people preferred for the virtual avatar.

19. The computer system of claim 15, wherein the instructions to render the virtual presentation further includes instructions to manipulate the avatar's facial expressions based on the audio content played in the virtual presentation.

20. The computer system of claim 15, wherein the instructions to render the virtual presentation further includes instructions to manipulate the avatar's mouth to lip sync the audio content of the presentation simultaneously while the visual content associated with the audio content of the virtual presentation is being displayed to the viewer.

* * * * *